(12) United States Patent
Potter

(10) Patent No.: US 8,277,062 B2
(45) Date of Patent: Oct. 2, 2012

(54) LAMP ASSEMBLY AND HOUSING THEREFOR

(75) Inventor: Brant James Potter, Columbus, IN (US)

(73) Assignee: Valeo Sylvania L.L.C., Seymour, IN (US)

( * ) Notice: Subject to any disclaimer, the term of this patent is extended or adjusted under 35 U.S.C. 154(b) by 100 days.

(21) Appl. No.: 12/924,517

(22) Filed: Sep. 29, 2010

(65) Prior Publication Data

US 2012/0075849 A1 Mar. 29, 2012

(51) Int. Cl.
*F21V 7/00* (2006.01)
*B60Q 1/26* (2006.01)

(52) U.S. Cl. ............ 362/30; 362/329; 362/298; 362/540

(58) Field of Classification Search .................... 362/29, 362/30, 541, 540, 517, 329, 298
See application file for complete search history.

(56) References Cited

U.S. PATENT DOCUMENTS

| | | | |
|---|---|---|---|
| 6,086,227 A | 7/2000 | O'Connell et al. | |
| 6,846,100 B2 * | 1/2005 | Imazeki et al. | ............... 362/517 |
| 6,871,988 B2 | 3/2005 | Gebauer et al. | |
| 6,883,947 B1 * | 4/2005 | Sarabia | .......................... 362/540 |
| 7,021,806 B2 * | 4/2006 | Ovenshire | ...................... 362/527 |
| 7,377,676 B2 * | 5/2008 | Thomas et al. | ............... 362/500 |
| 7,575,343 B2 | 8/2009 | Li et al. | |
| 7,600,890 B2 | 10/2009 | Swantner et al. | |
| 7,607,808 B2 * | 10/2009 | Birman et al. | ................. 362/489 |
| 7,665,237 B2 | 2/2010 | Swantner et al. | |
| 7,753,540 B2 * | 7/2010 | Swantner et al. | ............... 362/30 |
| 2006/0291214 A1 | 12/2006 | Tessnow et al. | |
| 2008/0042867 A1 | 2/2008 | Swantner et al. | |

* cited by examiner

*Primary Examiner* — Peggy A. Neils
(74) *Attorney, Agent, or Firm* — Edward S. Podszus

(57) ABSTRACT

A lamp assembly 10 has a housing 12 that preferably is non-rotationally symmetrical. In a particular embodiment the housing 12 can be rectangular; however, other non-rotationally symmetrical housings can also be employed. The housing 12 includes a base 14 and an upstanding wall 16 surrounding the base 14. The space between the cover 24 and the base 14 defines a light-conducting channel 34. A light-receiving aperture 36 is defined in the housing 12 and in one instance is formed to receive light from a light source 22. A first light-receiving conduit 38 is defined in the light-conducting channel 34 and is formed to receive light from the light source 22 that is fitted into the light-receiving aperture 36 and conduct light to a second light-receiving conduit 40 defined in the light-conducting channel 34. The second light-receiving conduit 40 is positioned at an angle relative to the first light-receiving conduit 38 and has a proximal region 42 to receive light from the first light-receiving conduit 34 and a distal region 44 to emit light. The second conduit 40 is not directly in the line of sight of the first conduit 38 and thus relies upon reflected light from the light source 22. The upper cover 24 comprises a light transmissive peripheral region 26 that is in communication with the light-emitting distal region 44 of the second light-receiving conduit 40.

9 Claims, 5 Drawing Sheets

LAMP ASSEMBLY AND HOUSING THEREFOR

CROSS-REFERENCE TO RELATED APPLICATIONS

There is no cross-reference to a related application.

GOVERNMENT CONTRACT

This invention was not made under any government contract and the United States Government has no rights under this invention.

TECHNICAL FIELD

This invention relates to lamps and more particularly to lamps having an appealing lighted appearance together with flexible styling possibilities. More particularly, it relates to lamps having light emitting surfaces that form perimeter shapes that can be used, for example, as brake or stoplight or taillight assemblies for motor vehicles.

BACKGROUND ART

Industry trends often require lamps having distinguishing shapes. Such requirements frequently arise in the automotive industry where a distinctive appearance is to be coupled with sufficient illumination to meet safety standards. In this regard, shapes that have corners, e.g., square, and/or are non-rotationally symmetrical, e.g., rectangular, are particularly difficult to execute using typical optical designs.

It is known in published United States patent application US2008/0042867 (Swantner et al.) to have an indicator lamp with an opaque base and a translucent cover. A vehicle lamp light guide is known in U.S. Pat. No. 6,871,988 (Gebauer).

DISCLOSURE OF INVENTION

It is an object of the invention to enhance light sources.

Yet another object of the invention is the improvement of peripheral light sources for automotive vehicles.

These objects are accomplished, in one aspect of the invention, by a lamp assembly having a housing, preferably a housing that is non-rotationally symmetrical and including a base, with an upstanding wall surrounding the base. The upstanding wall has a first portion extending from the base at an angle of less than 90 degrees and a second portion that makes an angle of 90 degrees with the base. At least one light source extends into the base; and a cover closes the housing, the cover having a hollow, illuminable, translucent periphery and, preferably, an opaque center.

With this design the emitting surface is believed to have a uniform lit appearance reminiscent of a light guide "blade"-like exit surface. An emitting surface that covers a relatively large frontal area while maintaining a small package depth can be provided and such a structure is suited to use for automotive signal functions, including stoplight, taillight, turn or backup signals. The light source can be supplied by a light emitting diode (LED), such as a side-emitting LED, by plural LEDs, or an incandescent or other source. If desired, combinations of different light sources can be used.

BEST MODE FOR CARRYING OUT THE INVENTION

Figure 1:
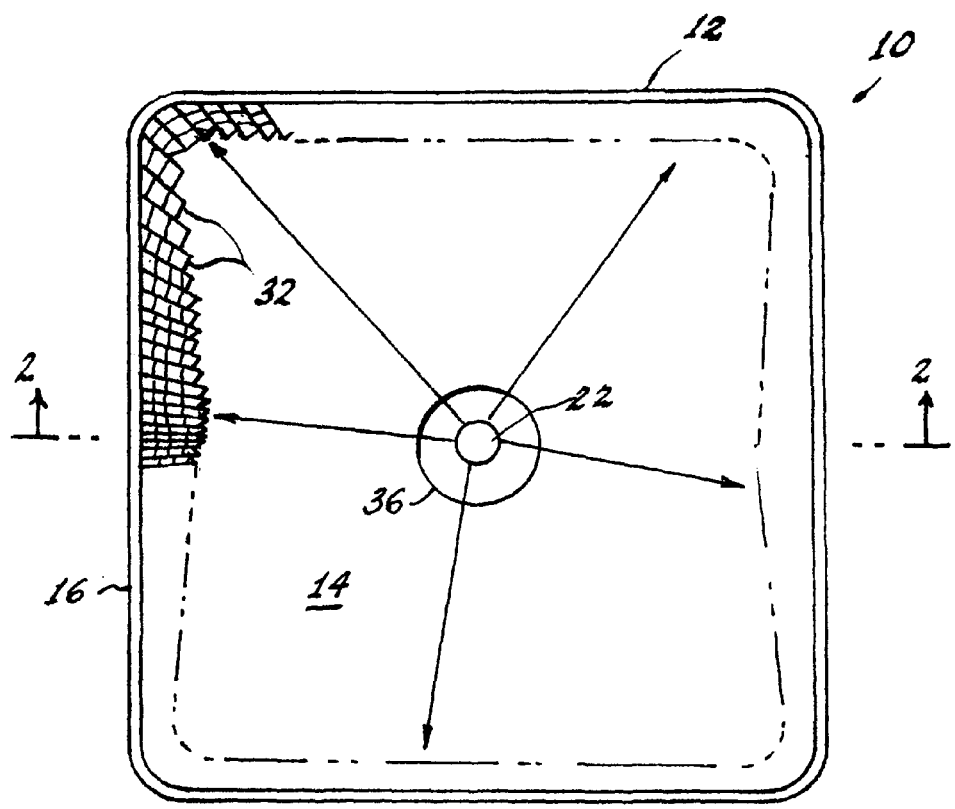
FIG. 1 is a plan view of an embodiment of the invention.

For purposes of this application it is to be understood that when an element or layer is referred to as being "on," "connected to" or "coupled to" another element or layer, it can be directly on, connected to or coupled to the other element or layer, or intervening elements or layers may be present. In contrast, when an element is referred to as being "directly on," "directly connected to" or "directly coupled to" another element or layer, there are no intervening elements or layers present. Like numbers refer to like elements throughout. The term "and/or" includes any and all combinations of one or more of the associated listed items.

Although the terms "first," "second," "third" etc. may be used to describe various elements, components, regions, layers and/or sections, these elements, components, regions, layers and/or sections are not to be limited by theses terms as they are used only to distinguish one element, component, region, layer or section from another element, component, region, layer or section. Thus, a first element, component, region, layer or section could be termed a second element, component, region, layer or section without departing from the scope and teachings of the present invention.

Spatially relative terms, such as "beneath," "below," "upper," "lower," "above" and the like may be used herein for ease of description to describe one element or feature's relationship to another element(s) or feature(s) as illustrated in the drawings. These spatially relative terms are intended to encompass different orientations of the device in use or operation in addition to the orientation shown in the drawings. For example, if the device in the drawings is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. For example, as used herein, the singular forms "a," "an" and "the" are intended to include the plural forms as well, unless the context clearly indicates otherwise. It will be further understood that the terms, "comprises" and/or "comprising," when used in this specification, specify the presence of stated features, integers, steps operations, elements, and/or components, but do not preclude the presence or addition of one or more other features, integers, steps, operations, elements, components, and/or groups thereof.

For a better understanding of the present invention, together with other and further objects, advantages and capabilities thereof, reference is made to the following disclosure and appended claims taken in conjunction with the above-described drawings.

Referring now to the drawings with greater particularity there is shown in FIG. 1 a lamp assembly 10 comprising a housing 12 that is preferably non-rotationally symmetrical. In this particular instance the housing 12 is rectangular; however, other non-rotationally symmetrical housings can also be employed. The housing 12 includes a base 14 and an upstanding wall 16 surrounding the base 14. A cover 24 closes the housing 12. The space between the cover 24 and the base 14 defines a light-conducting channel 34. A light-receiving aperture 36 is defined in the housing 12 and is formed to receive light from a light source 22. A first light-receiving conduit 38 is defined in the light-conducting channel 34 and is formed to receive light from the light source 22 that is fitted into the light-receiving aperture 36 and conduct light to a second light-receiving conduit 40 defined in the light-conducting channel 34. The second light-receiving conduit 40 is positioned at an angle relative to the first light-receiving conduit 38 and has a proximal region 42 to receive light from the first light-receiving conduit 38 and a distal region 44 to emit light. The second conduit 40 is not directly in the line of sight of the first conduit 38 and thus relies upon reflected light from the light source 22. The upper cover 24 comprises a light transmissive peripheral region 26 that is in communication with the light-emitting distal region 44 of the second light-receiving conduit 40.

The lower base 14 comprises reflector optics 32 mounted thereon on or formed therein between the first light-receiving conduit 38 and the second light-receiving conduit 40 and the optics are positioned to direct light received from the first light-receiving conduit 38 upwards from the lower base 14 to the light transmissive peripheral region 26, whereby light exits the upper cover 24.

Figure 2:
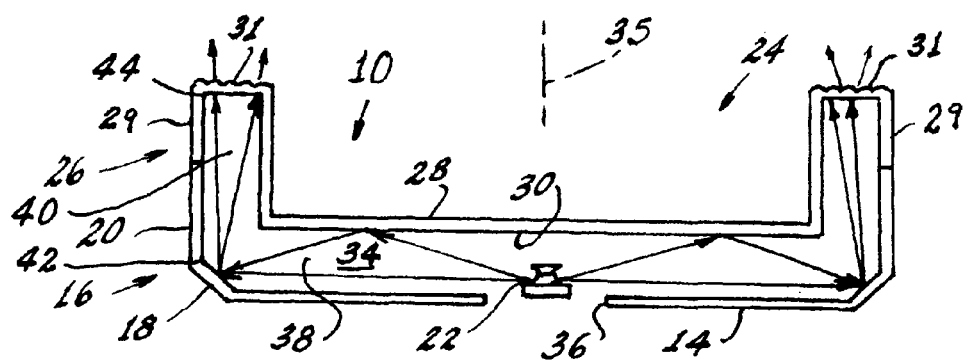
FIG. 2 is a sectional view taken along the line 2-2 of FIG. 1.

The upstanding wall 16 has a first portion 18 extending from the base 14 at an angle of less than 90 degrees, e.g., 45 degrees, and a second portion 20 that makes an angle of 90 degrees with the base 14 and, preferably, has an extended flat surface, as shown in FIG. 2. The second light-receiving conduit 40 is positioned preferably at an angle of about 90 degrees relative a general layout or floor of lower base 14. The reflector optics 32 are mounted so as to form an angle of less than 90 degrees with the general layout or floor of lower base 14, preferably at about 45 degrees thereto.

Figure 8:
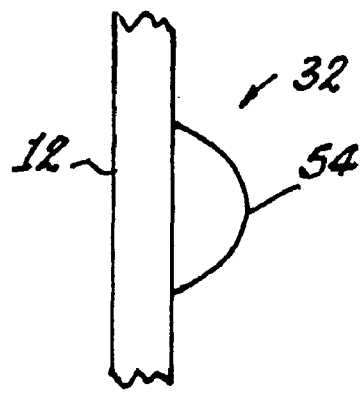
FIGS. 8-10 are diagrammatic, cross-sections of reflector configurations that can be used with the invention.
Figure 9:
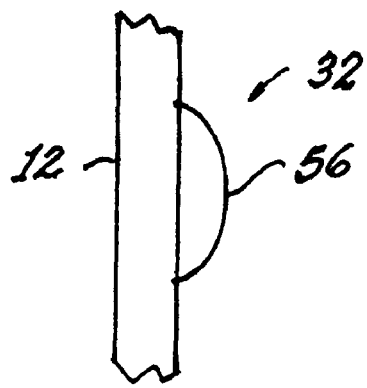
Figure 10:

The cover 24 has a hollow, illuminable, translucent periphery 26 and, preferably, an opaque center 28. In a preferred embodiment, the inside surface 30 of the opaque center 28 of the cover 24 is reflective, for example, by metallization of a plastic, as shown in FIG. 2. The first portion 18 of the upstanding wall 16 is provided with the reflector optics 32, which can take the form of triangular prisms, which preferably are also provided with a reflector coating. The reflector optics 32 are segmented conic sections called "conics". The reflector optics 32 can take any other non-rotationally symmetrical shape, for example, ellipse, triangle, freeform, etc. and generally are 1 to 2 mm wide. The reflector optics 32 direct light to the emitting surface. As shown more clearly in cross-section in FIGS. 8-10, the optics 32 can comprise stepped parabolic, ellipsoid or flat sections 54, 56, 58, respectively, although the parabolic sections 54 are preferred.

The hollow, illuminable, translucent periphery 26 of the cover 24 is spaced from the opaque center 28 along a longitudinal axis 35, thus allowing the sides 29 of the cover 24, as well as the leading surface 31, to be illuminated if desired. The sides 29 are elongated relative to the leading surface 31.

In the embodiment shown in FIGS. 1 and 2 a single light source 22 is centrally located in the base 14 and in a preferred embodiment of the invention the light source is a side emitting LED.

Figure 3:
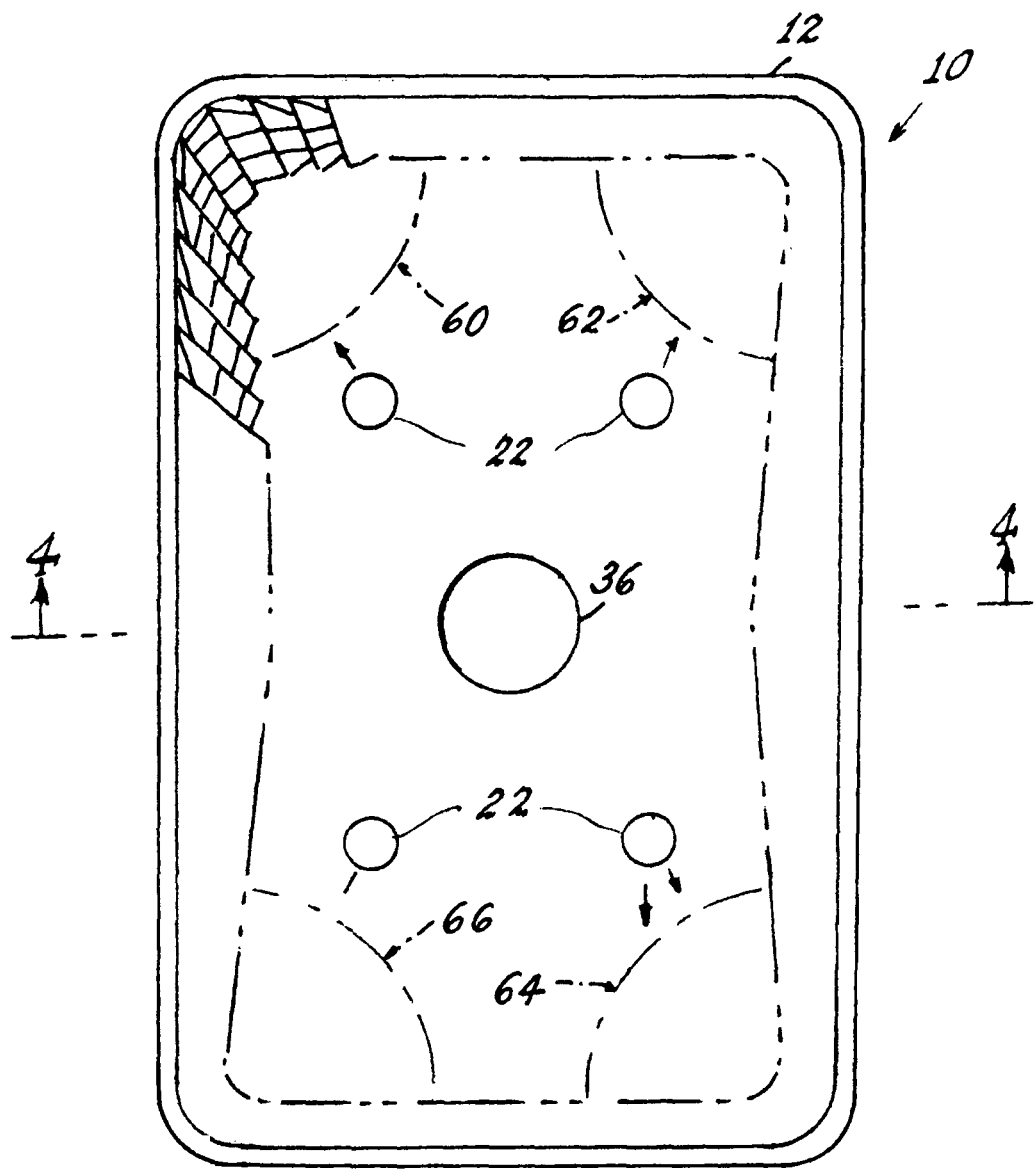
FIG. 3 is a plan view of an alternate embodiment of the invention.

In an alternate embodiment of the invention, shown in FIG. 3, multiple light sources 22 are provided nearer the corners of the base 14. In the embodiment shown in FIG. 3 there are four sectors, 60, 62, 64, 66, one each associated with each of the light sources 22. In FIG. 3 only the sector 60 is detailed for purposes of clarity, it being understood that the other sectors can be identical in this instance. Each sector uses one light source 22 as a focus of the reflector optics 32. If desired, a central opening or aperture 36 can also be provided for the reception of an additional apparatus that can be used to enhance the lamp assembly 10. Several examples of such enhancements are shown diagrammatically in FIGS. 4-6.

Figure 4:
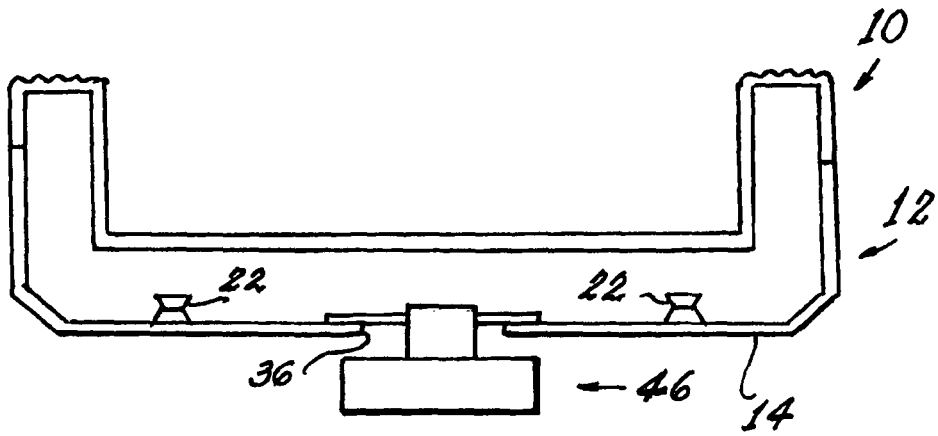
FIG. 4 is a sectional view taken along the line 4-4 of FIG. 3 illustrating an additional embodiment of the invention.

Referring specifically to FIG. 4, an aperture 36 formed in the base 14 can accommodate circuitry 46 for controlling the light sources 22 individually or provide an on/off function that would give the light sources 22 the appearance of blinking.

Figure 5:
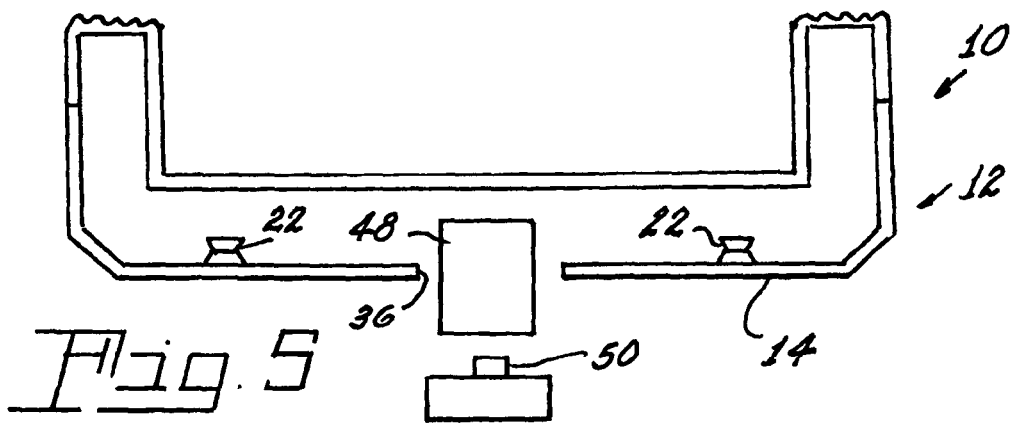
FIG. 5 is a view similar to FIG. 4 illustrating another embodiment of the invention.

As shown in FIG. 5 an aperture 36 can be fitted with a light guide 48 that receives light from an additional light source 50. The light source 50 in this instance can be a forward-light emitting LED.

Figure 6:
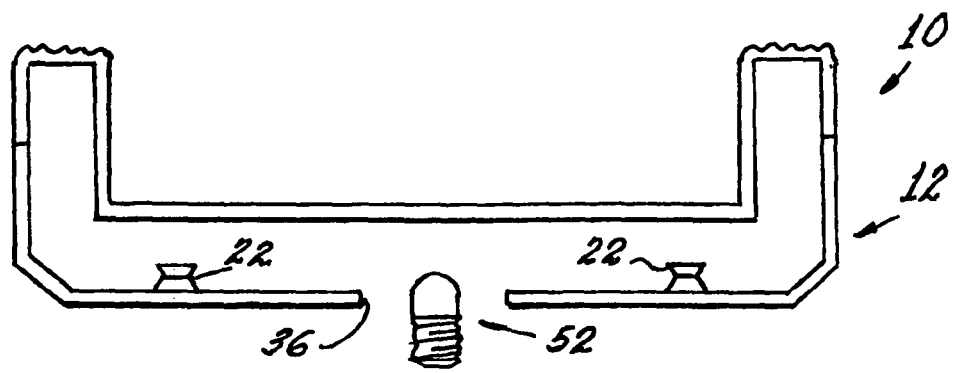
FIG. 6 is a similar view illustrating yet another embodiment of the invention.

Yet another embodiment is shown in FIG. 6 wherein an incandescent light source 52 can be employed. As is known to those skilled in the art various light sources have differing spectral displays and operating characteristics and the aperture 36 allows multiple options.

Of course, should a different function be provided by any additional apparatus fitted to aperture 36, necessary modifications to the opaque center 28 can be made to accommodate the additional feature or features. In all embodiments it is desirable for the base 14 to be reflective also.

Figure 7:
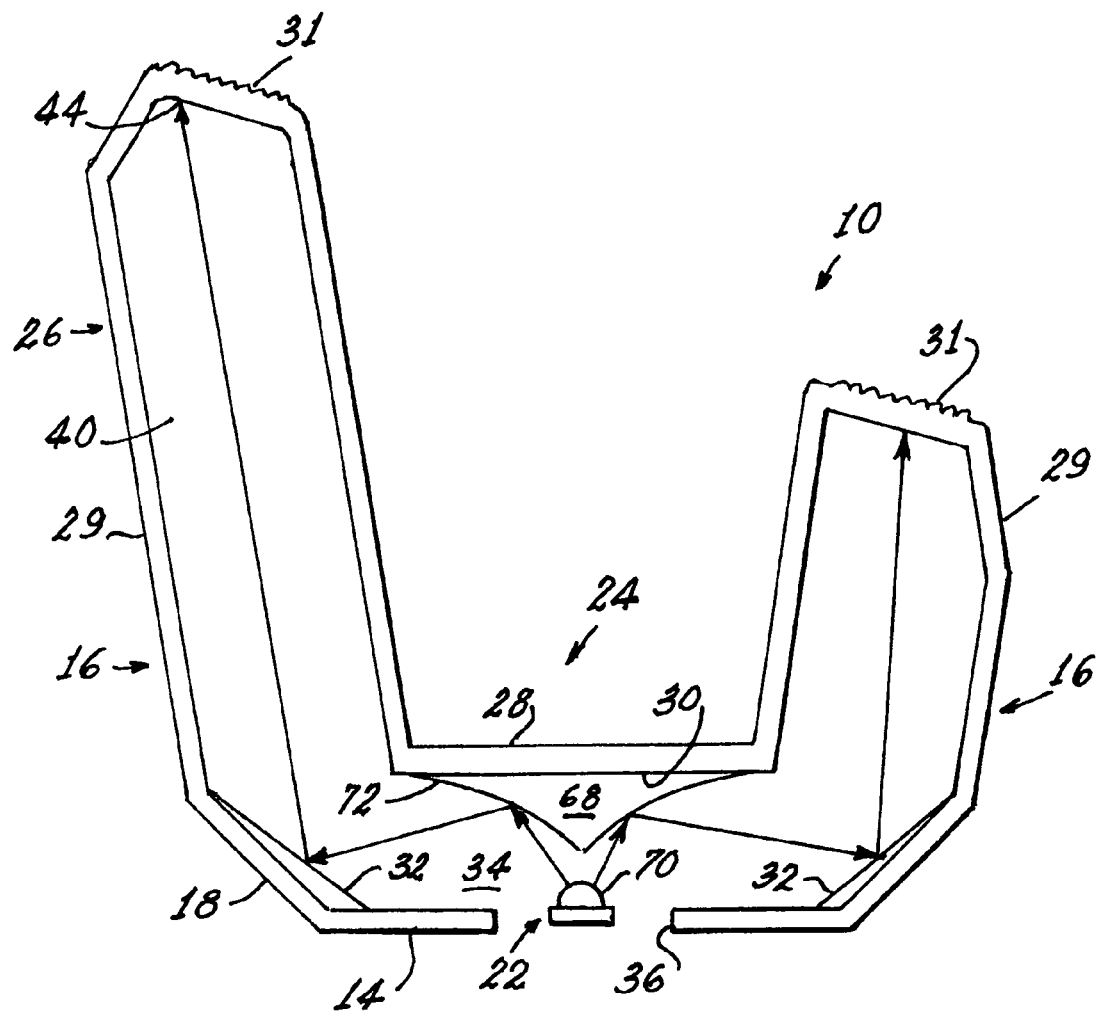
FIG. 7 is a similar view illustrating another embodiment of the invention.

For example, referring now to FIG. 7 there is shown a lamp assembly 10 having upstanding walls 16 of differing heights. The light source 22 in this embodiment is provided with a lens 70 and the inside surface 30 of cover 24 has a substantially cone-shaped reflector 68 affixed thereto. The sides 72 of the reflector 68 can be parabolic. As with the other embodiments, the leading surfaces 31 can be provided with optics to control the exiting light distribution.

Suitable materials for the base include polycarbonates, acyrlonitrile butadiene styrene (ABS) or other thermosetting plastics, and suitable materials for the cover include glass or transparent or translucent plastics, such as polycarbonates.

Thus there is provided a light source that is easy and inexpensive to manufacture and that can be used with non-rotationally symmetrical displays. When used with the latter types of displays it does not require the use of solid waveguides that were frequently employed in the prior art; however, as noted above, solid light guides may be used if desired.

While there have been shown and described what are at present considered to be the preferred embodiments of the invention, it will be apparent to those skilled in the art that various changes and modifications can be made herein without departing from the scope of the invention as defined by the appended claims.

GLOSSARY OF REFERENCE NUMERALS USED HEREIN 10 lamp assembly
12 housing
14 base
16 upstanding wall on 14
18 first portion of 16
20 second portion of 16
22 light source
24 cover
26 periphery of 24
28 opaque center of 24
29 side of 24
30 inside surface of 24
31 leading surface of 24
32 reflector optics
34 light-conducting channel
35 center line
36 aperture
38 first light-receiving conduit
40 second light-receiving conduit
42 proximal region of 40
44 distal region of 40
46 control circuitry
48 light guide
50 forward light emitting diode
52 incandescent light source
54 parabolic optic
56 ellipsoidal optic
58 flat optic
60 first sector
62 second sector
64 third sector
66 fourth sector
68 cone-shaped reflector
70 lens on 22

What is claimed is:

1. A lamp housing (12) comprising a lower base (14) and an upper cover (24) in register with said lower base (14) and defining a hollow light-conducting channel (34) therebetween;
   a light-receiving aperture (36) defined in said housing (12) and formed to receive light from a light source;
   a first light-receiving conduit (38) defined in said light-conducting channel (34) and formed to receive light from said light-receiving aperture and conduct light to a second light receiving conduit (40) defined in said light-conducting channel, said second light-receiving conduit (40) being positioned at an angle relative said first light-receiving conduit (38) and having a proximal region (42) to receive light from said first light-receiving conduit (36) and a distal region (44) to emit light; and wherein
   said upper cover (24) comprises a light transmissive peripheral region (26) in communication with said light-emitting distal region (44) of said second light receiving conduit (40), and
   said housing (12) further comprising reflector optics (32) mounted thereon between said first light-receiving conduit (38) and said second light-receiving conduit (40) and positioned to direct light received from said first light-receiving conduit (38) upwards from said lower base (14) to said light transmissive peripheral region (26) whereby light exits said upper cover (24), and
   wherein said upper cover (24) has an opaque center (28) and an inside surface (30) has a substantially cone-shaped reflector affixed thereto.

2. The lamp housing (12) of claim 1 wherein said housing (12) is non-rotationally symmetrical.

3. The lamp housing (12) of claim 1 wherein said angle of a portion of said second light receiving conduit (40) relative said first light-receiving conduit (38) is 45 degrees.

4. The lamp housing (12) of claim 1, wherein said light transmissive peripheral region (26) is spaced from said opaque center (28).

5. The lamp housing (12) of claim 1 wherein said housing (12) includes a light source (22) positioned therein and forms a part of a lamp assembly (10).

6. The lamp housing (12) of claim 5 wherein said light source (22) comprises a plurality of light-emitting units (22).

7. The lamp housing (12) of claim 6 wherein said light-emitting units (22) are side-emitting LEDs.

8. The lamp housing (12) of claim 7 wherein said base (14) is reflective.

9. The lamp housing (12) of claim 1 wherein said lower base (14) of said housing (12) comprises said reflector optics (32).

* * * * *